(12) United States Patent
Palfai et al.

(10) Patent No.: US 9,618,108 B2
(45) Date of Patent: Apr. 11, 2017

(54) GEAR NOISE REDUCTION IN OPPOSED-PISTON ENGINES

(71) Applicant: Achates Power, Inc., San Diego, CA (US)

(72) Inventors: Balazs V. Palfai, Carlsbad, CA (US); Michael S. Tebbe, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 478 days.

(21) Appl. No.: 13/944,787

(22) Filed: Jul. 17, 2013

(65) Prior Publication Data

US 2015/0020627 A1    Jan. 22, 2015

(51) Int. Cl.
*F16H 55/18*    (2006.01)
*F02B 75/28*    (2006.01)

(52) U.S. Cl.
CPC ............ *F16H 55/18* (2013.01); *F02B 75/28* (2013.01); *F02B 75/282* (2013.01); *Y10T 74/19679* (2015.01); *Y10T 74/19916* (2015.01)

(58) Field of Classification Search
CPC .. F16H 55/18; F16H 2055/185; F02B 75/065; F02B 75/225
See application file for complete search history.

(56) References Cited

U.S. PATENT DOCUMENTS

| | | | | |
|---|---|---|---|---|
| 1,456,700 A | * | 5/1923 | Luhr | B23B 39/20 |
| | | | | 74/445 |
| 1,803,296 A | * | 4/1931 | Bethune | F16H 1/206 |
| | | | | 74/443 |
| 2,748,618 A | * | 6/1956 | Lee | F16H 55/12 |
| | | | | 74/439 |
| 3,602,058 A | * | 8/1971 | Beddoe | D01H 1/20 |
| | | | | 74/434 |
| 3,719,103 A | * | 3/1973 | Streander | F16H 55/18 |
| | | | | 74/440 |

(Continued)

FOREIGN PATENT DOCUMENTS

DE    4042425 A1    6/1992
DE    10326819 A1    12/2004

(Continued)

OTHER PUBLICATIONS

International Search Report and Written Opinion for PCT application No. PCT/US2014/046899, mailed Jan. 22, 2015.

(Continued)

*Primary Examiner* — Zakaria Elahmadi
(74) *Attorney, Agent, or Firm* — Terrance A. Meador; Julie J. Muyco (57) ABSTRACT

A quiet-running, multi-layer gear assembly includes a compliant center member sandwiched between a pair of stiff outer members. The compliant center member has an outer peripheral surface with gear teeth. Each of the outer members has an outer peripheral surface with gear teeth disposed in a respective directed axial thrust pattern. The center and outer members are joined on a central hub with their outer peripheral surfaces aligned so as to form a gear assembly with low or no net axial thrust. In some aspects, the compliant center member and the hub include cooperating anti-turn constructions.

10 Claims, 6 Drawing Sheets

(56) References Cited

U.S. PATENT DOCUMENTS

| | | | | |
|---|---|---|---|---|
| 4,696,201 A * | 9/1987 | Hattori | ........................ | F01L 1/02 |
| | | | | 184/6.12 |
| 4,700,582 A | 10/1987 | Bessette | ........................ | 74/409 |
| 4,767,287 A * | 8/1988 | Marks | ........................ | F02B 59/00 |
| | | | | 123/42 |
| 4,805,475 A | 2/1989 | Hannel | ........................ | 74/440 |
| 5,813,335 A * | 9/1998 | Burke | ........................ | B41F 13/012 |
| | | | | 101/177 |
| 5,870,928 A | 2/1999 | Genter et al. | ........................ | 74/440 |
| 5,979,259 A * | 11/1999 | Shook | ........................ | F16H 55/18 |
| | | | | 123/90.31 |
| 5,979,260 A | 11/1999 | Long et al. | ........................ | 74/440 |
| 6,095,110 A * | 8/2000 | Desclaux | ........................ | F01B 31/24 |
| | | | | 123/197.1 |
| 6,148,684 A * | 11/2000 | Gardiner | ........................ | B41F 13/012 |
| | | | | 101/216 |
| 6,247,377 B1 | 6/2001 | Long et al. | ........................ | 74/440 |
| 6,415,674 B1 | 7/2002 | Davis et al. | ........................ | 74/409 |
| 6,419,061 B1 * | 7/2002 | Ring | ........................ | B61H 13/04 |
| | | | | 188/82.84 |
| 7,752,937 B1 * | 7/2010 | Dornan | ........................ | F16H 55/18 |
| | | | | 74/409 |
| 8,205,520 B2 * | 6/2012 | Thoma | ........................ | F16H 55/18 |
| | | | | 74/409 |
| 9,297,451 B2 * | 3/2016 | Buchleitner | ........................ | F16H 55/18 |
| 2004/0069086 A1 * | 4/2004 | Thoma | ........................ | F16H 55/18 |
| | | | | 74/443 |
| 2012/0266706 A1 | 10/2012 | Brosowske et al. | ........................ | 74/409 |
| 2012/0285422 A1 | 11/2012 | Exner et al. | ........................ | 123/51 |
| 2013/0116082 A1 | 5/2013 | Hagedorn | ........................ | 475/317 |
| 2013/0228029 A1 * | 9/2013 | Murphy | ........................ | F16H 55/18 |
| | | | | 74/443 |
| 2013/0319349 A1 * | 12/2013 | Obrist | ........................ | B60K 6/24 |
| | | | | 123/2 |
| 2014/0123795 A1 * | 5/2014 | Izume | ........................ | F16H 55/18 |
| | | | | 74/409 |
| 2014/0332306 A1 * | 11/2014 | Fuqua | ........................ | B60K 5/02 |
| | | | | 180/291 |
| 2015/0020629 A1 | 1/2015 | Koszewnik et al. | | |

FOREIGN PATENT DOCUMENTS

| | | |
|---|---|---|
| DE | 202010005941 U1 | 7/2010 |
| EP | 1391637 A2 | 2/2004 |
| WO | WO-20151009858 A1 | 1/2015 |

OTHER PUBLICATIONS

Non-Final Office Action mailed Sep. 20, 2016, in U.S. Appl. No. 14/074,618.

Final Office Action mailed Jan. 11, 2017, in U.S. Appl. No. 14/074,618.

* cited by examiner

GEAR NOISE REDUCTION IN OPPOSED-PISTON ENGINES

RELATED APPLICATIONS

This application contains subject matter related to that of U.S. patent application Ser. No. 13/385,539, filed Feb. 23, 2012, published as US 2012/0285422 A1 on Nov. 15, 2012.

BACKGROUND

The field is reduction of noise, vibration, and harshness (NVH) in an internal combustion engine. More specifically, the field covers reduction of gear noise and vibration in an opposed-piston engine.

Gear vibration and clash in an internal combustion engine lead to intense whining and/or sharp impulse noise which can cause extreme operator and passenger discomfort. Engine whine and rattle also add to the constant cacophony that makes proximity to transportation routes very unpleasant. Consequently, performance standards and environmental regulations relating to vehicles increasingly include NVH limits.

Whenever gears interface with each other, there is side contact between the respective gear teeth. These teeth side contacts are classified as overrunning side contacts or driving side contacts. Because of these contacts, there is usually a gap between the interfacing gear teeth. As the gears rotate, these gaps are closed when the teeth make new contacts, which can result in gear rattle. Backlash in the gear trains of opposed-piston engines during torque reversals will also produce gear rattle.

The gear train of an opposed-piston engine with dual crankshafts inherently experiences torque reversal events that produce clatter and vibration. In the case where a phase difference is provided between the crankshafts in order to differentiate port opening and closing times, the gear train is subjected to a torque reversal at least once every cycle of engine operation. Even without an inter-crankshaft phase difference, momentary inter-gear torque reversals result from idler bounce and/or gear/shaft rotational distortion. Torque reversals result in crank train rattle when gear backlash and powertrain gear teeth clearances are present.

U.S. Pat. No. 3,719,103 describes a multi-ply gear construction designed to be quiet-running. The gear construction includes a plastic center panel fastened between a pair of opposite metal side plates. Peripheral teeth are cut into a peripheral edge of the assembled gear. The plastic material yields to the cutting process, but the metal material does not. As a result, the central plastic segment of each tooth expands after the cutting operation such that the surfaces of the center segment are displaced outwardly of the corresponding side metal segments. With this multi-ply construction a gear is meshed with another gear in a manner eliminating backlash and preventing metal-to metal contact.

With respect to elimination of gear noise, the multi-ply gear construction described in the '103 patent is deficient in several respects. For example, by cutting gear teeth in a single fabrication step, the post-cutting expansion of the gear segments in the plastic center panel is imprecise and uneven, leading to a substantial variance in contact surface contours which allow a certain level of gear teeth side shifts with metal-to-metal contact noise. Further, the teeth are straight cut, which limits opportunities for suppressing gear lash. Finally, the multi-ply gear is mounted to a shaft by means of a mounting boss without any anti-turn mechanism to counteract rotational distortion between gear and shaft.

Consequently, opposed-piston engines need quiet-running gears constructed to prevent gear teeth side shifts caused by torque reversals, crankshaft phase differences, and idler bounce. It is further desirable to provide such gears with anti-turn provisions to reduce gear/shaft rotational impact.

SUMMARY

These problems are solved with a quiet-running multi-layer gear assembly wherein a compliant center member is sandwiched between a pair of stiff outer members. The compliant center member has an outer peripheral surface with gear teeth formed thereon. Each of the outer members has an outer peripheral surface with gear teeth formed thereon in a respective directed axial thrust pattern. The center and outer members are joined on a central hub with their outer peripheral surfaces aligned so as to form a gear assembly with low or no net axial thrust. In some aspects, the compliant center member and the hub include cooperating anti-turn constructions.

BRIEF DESCRIPTION OF THE DRAWINGS

The below-described drawings are intended to illustrate principles and examples discussed in the following description; they are not necessarily to scale.

DETAILED DESCRIPTION

Figure 1A:
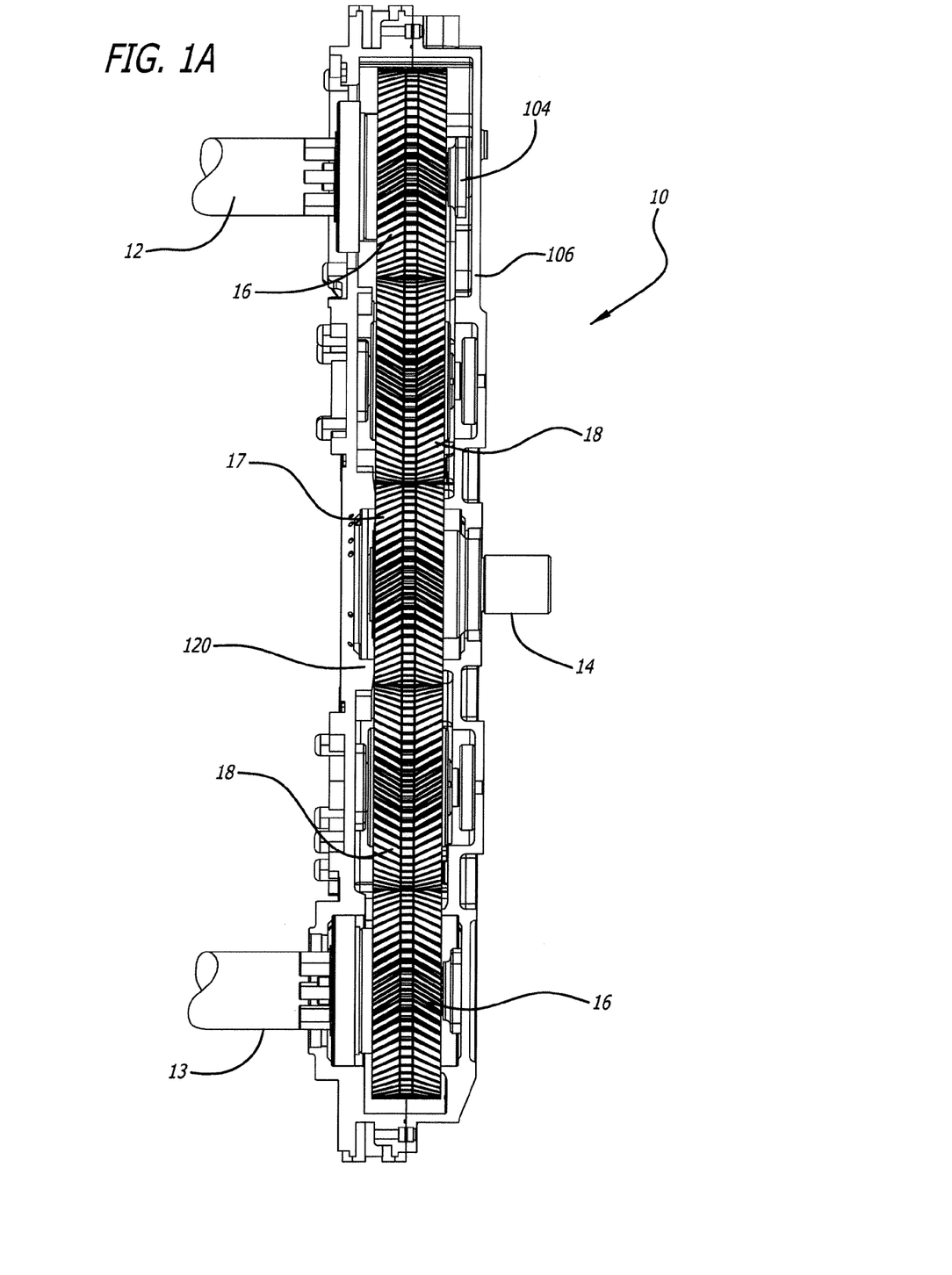
FIG. 1A is a side view of a gear train in an opposed-piston engine equipped with two crankshafts.
Figure 1B:
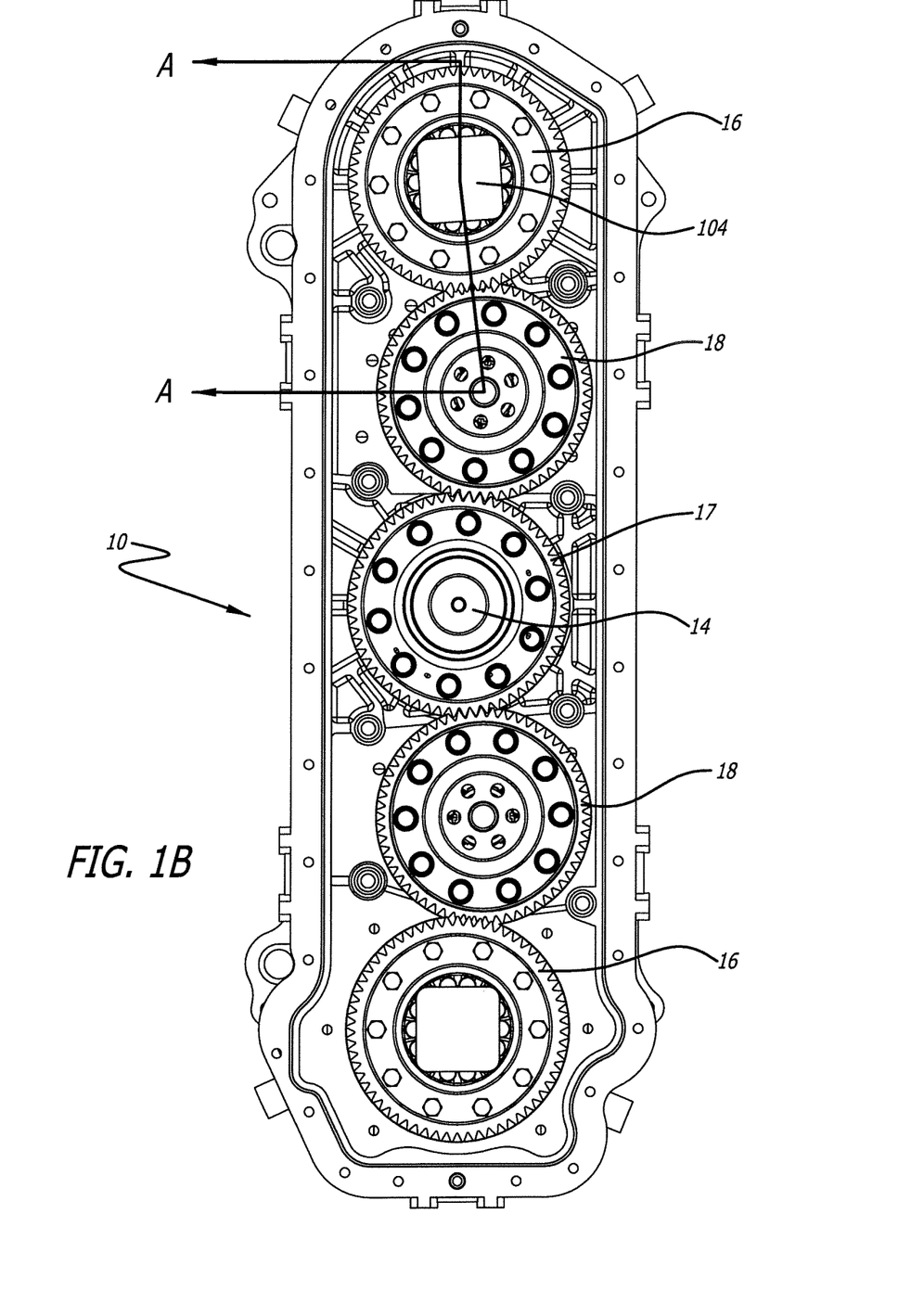
FIG. 1B is an end view of the same gear train with a gear box cover removed.

FIGS. 1A and 1B show a gear train 10 for an opposed-piston engine equipped with two crankshafts 12 and 13. The gear train 10 includes a plurality of gear assemblies (which may also be called "gears"), two of which (indicated by reference numeral 16) are fixed to respective ends of the crankshafts 12 and 13 for rotation thereby, and one of which (indicated by reference numeral 17) is fixed to the end of a power take-off shaft 19. In this configuration, two idler gear assemblies 18 are provided; as a result, the crankshafts 12 and 13 are co-rotating, that is to say, they rotate in the same direction. However, this is not meant to so limit the scope of this disclosure. In fact, the gear assembly construction disclosed in this specification can be incorporated into gear trains with fewer, or more, idlers, and with counter-rotating crankshafts.

It is desirable to provide quiet-running gears for a gear train such as the gear train 10 by use of a multi-ply gear assembly that reduces or eliminates noise and vibration caused by gear rattle. Such a gear assembly can be understood with reference to FIGS. 2 and 3.

Figure 2:
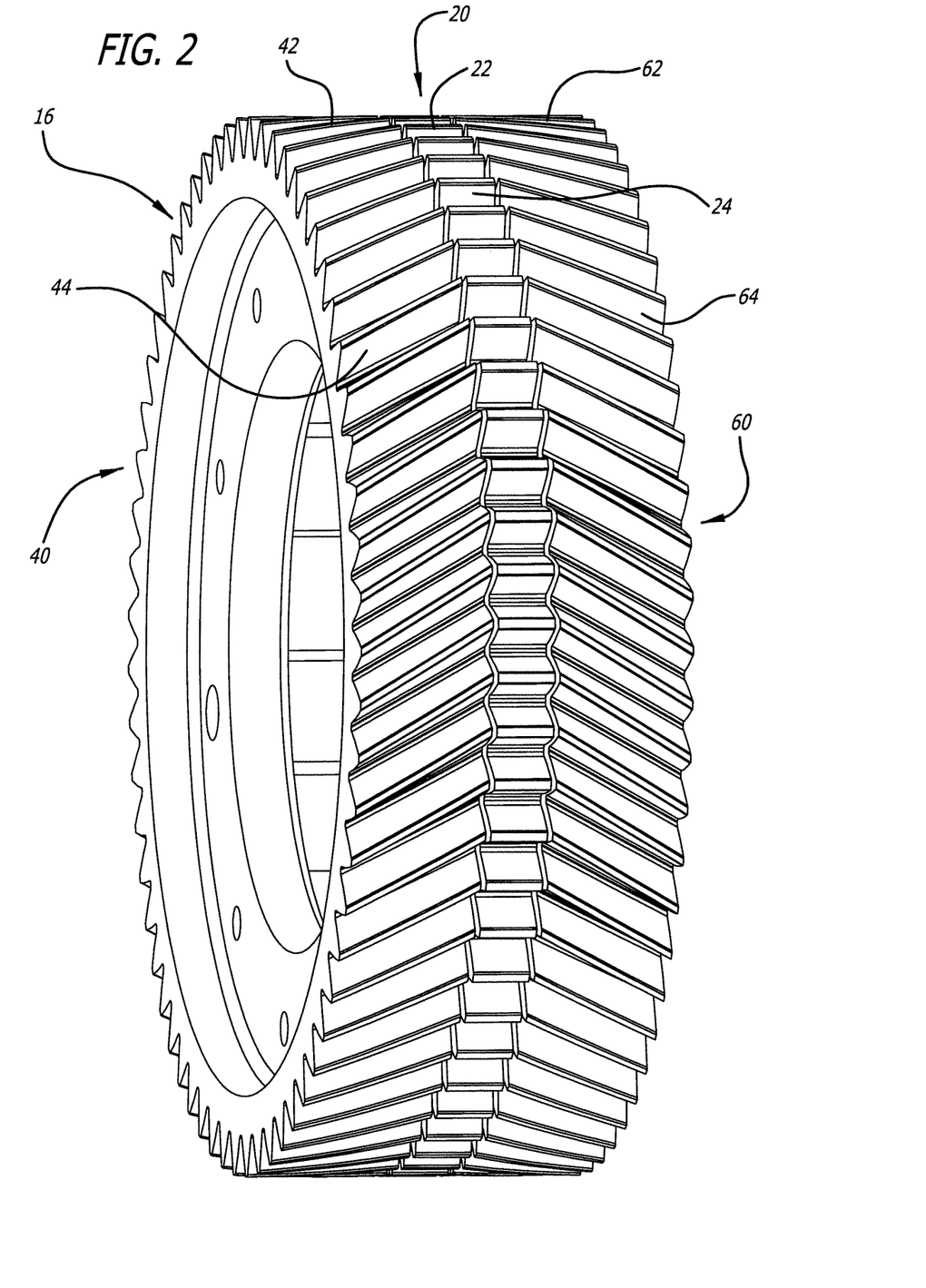
FIG. 2 shows a partially-assembled multi-ply gear assembly according to this specification.
Figure 3:
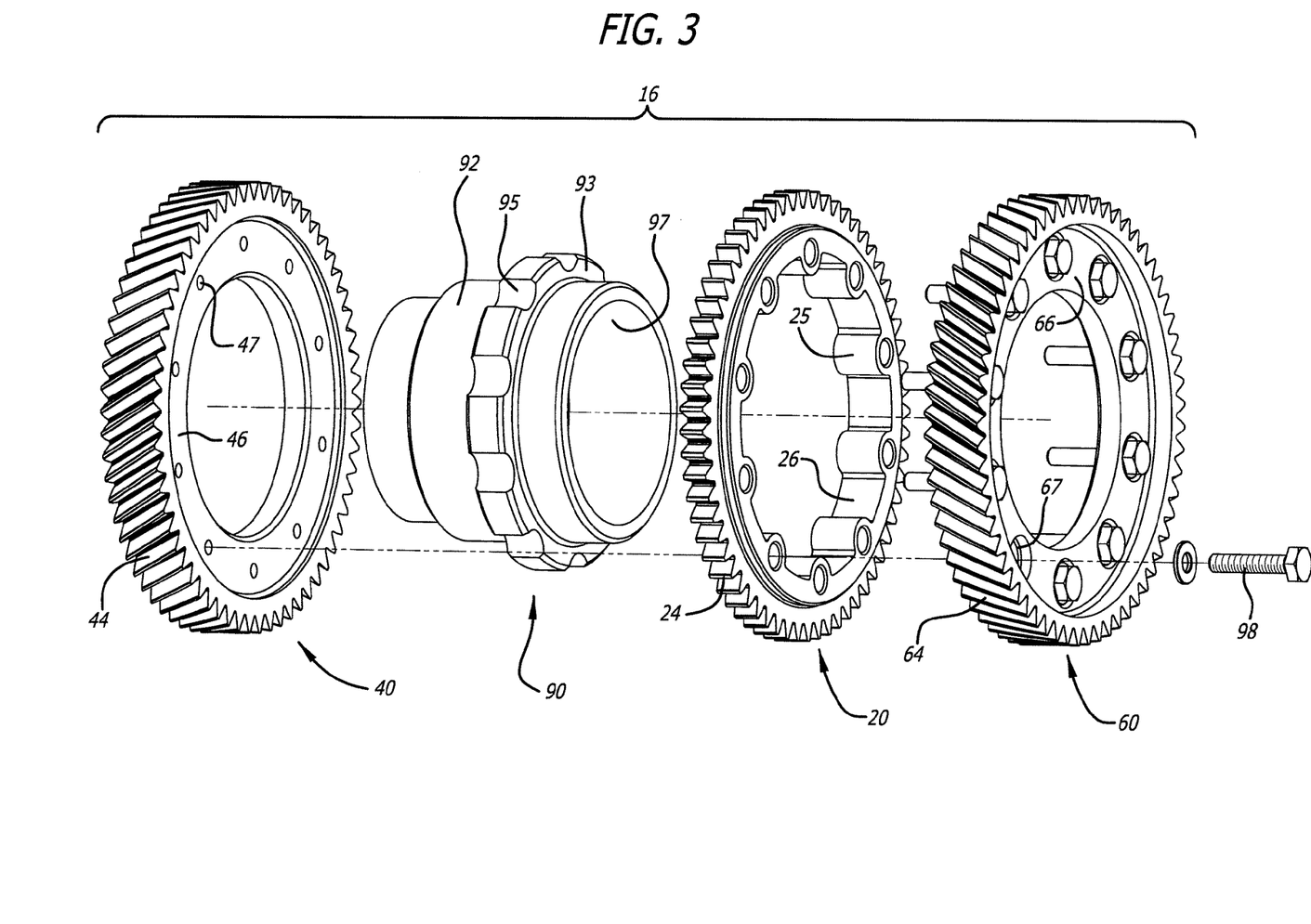
FIG. 3 is an exploded view showing additional elements of the multi-ply gear assembly of FIG. 2.

The gear assembly of FIGS. 2 and 3 is disclosed and illustrated with reference to a crank gear assembly 16, with the understanding that the components and the construction are found in the idler and power take-off gear assemblies 17 and 18 as well. As per FIGS. 2 and 3, a quiet-running multi-layer gear assembly 16 includes a compliant center member 20 sandwiched between a pair of stiff outer members 40 and 60; when the stiff outer members 40 and 60 are brought into close abutting contact with opposite sides of the compliant center member, the compliant center member 20 separates and axially spaces the stiff outer members 40 and 60. The compliant center member 20 and the stiff outer members 40 and 60 have generally annular constructions with approximately equal outer diameters. The annular construction of the compliant center member 20 includes an outer peripheral surface 22 on which gear teeth 24 are formed. The annular construction of the outer member 40 includes an outer peripheral surface 42 on which gear teeth 44 are formed. The annular construction of the outer member 60 includes an outer peripheral surface 62 on which gear teeth 64 are formed. On the outer peripheral surface 42 of the stiff outer member 40 the gear teeth 44 are disposed in a first directed axial thrust pattern; on the second stiff outer member 60, the gear teeth 64 are disposed in second directed axial thrust pattern. In some instances, the first and second directed axial thrust patterns together define oppositely-directed axial thrust patterns such as are provided on double helical or herringbone gears. On the embodiment of the compliant center member 20 shown in these figures, the gear teeth 24 project radially, thereby giving the compliant center member 20 the attributes of a spur or straight-cut gear; however this is not intended to be limiting as the gear teeth 24 may have other patterns.

As best seen in FIG. 3, the annular construction of the compliant center member 20 includes an inner surface portion with a plurality of circumferentially-spaced bosses 25. Each boss 25 is formed such that a portion of its sidewall protrudes in an inward radial direction of the compliant central member 20. As a result, the inner peripheral surface 26 of the compliant center member includes a planetary array of inwardly-directed semi-cylindrical projections. The annular construction of the stiff outer member 40 includes an inwardly projecting flange 46 with a plurality of circumferentially-spaced, threaded apertures 47 formed therein. The annular construction of the stiff outer member 60 includes an inwardly projecting flange 66 with a plurality of circumferentially-spaced, countersunk apertures 67 formed therein. A hub 90 has a generally cylindrical construction with an outer sidewall 92 and an outwardly-projecting flange 93 formed thereon. The peripheral surface of the flange 93 has a plurality of circumferentially-spaced, semicircular indentations 95 formed therein.

Figure 4:
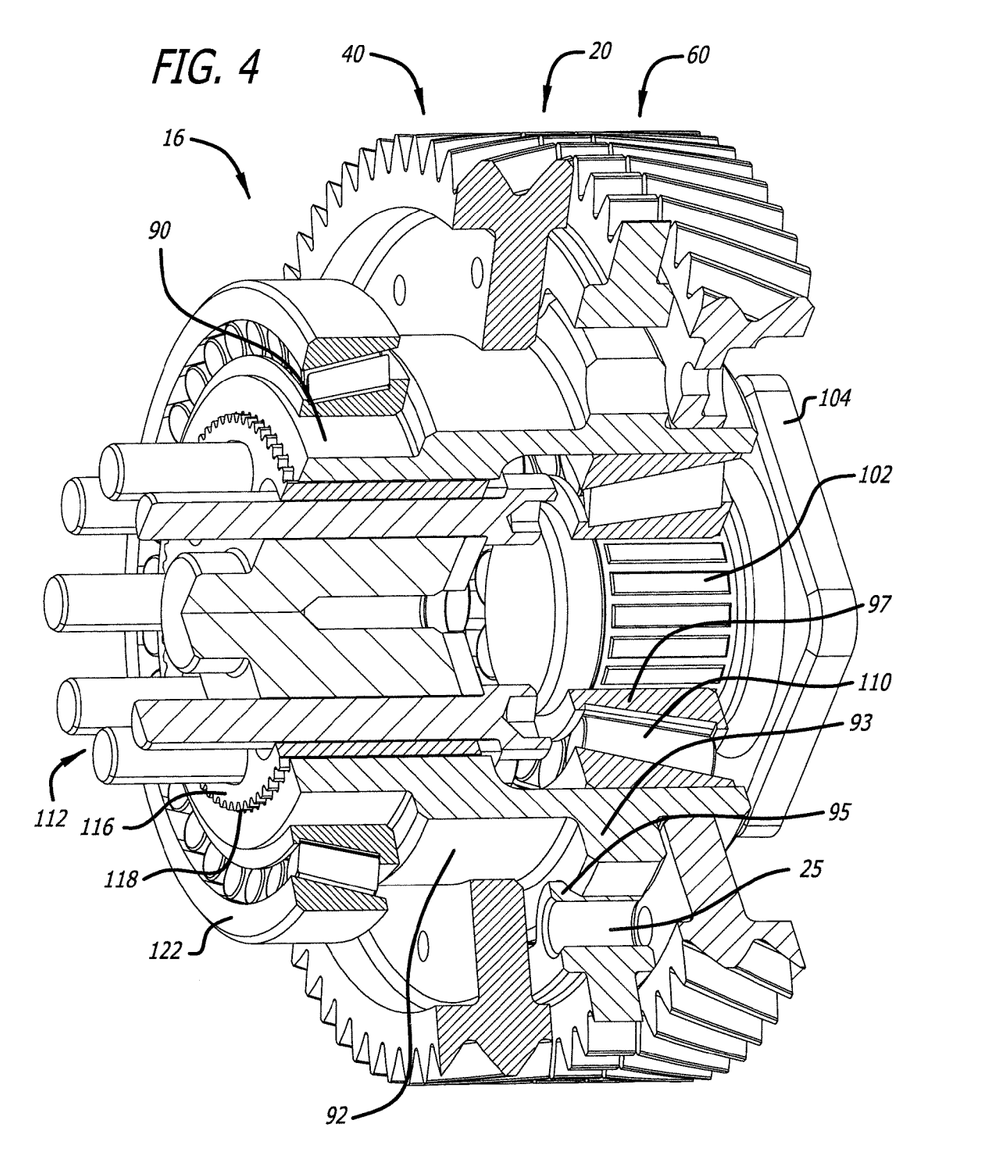
FIG. 4 is a three-dimensional cutaway view of the multi-ply gear assembly of FIG. 3 equipped to be mounted to a crankshaft.

The quiet-running multi-ply gear assembly 16 is assembled as shown in FIGS. 3 and 4. The bosses 25 and the indentations 95 are aligned, and the compliant center member 20 is fitted to the flange 93, with the planetary array of inwardly-directed semi-cylindrical projections of the bosses 25 received in the plurality of indentations 95. The apertures 47 and bosses 25 are registered and the stiff outer member 40 is received on one side of the compliant center member 20. The apertures 67 and bosses 25 are registered and the stiff outer member 60 is received on the opposite side of the compliant center member 20. Threaded fasteners 98 secure the stiff outer member 60 to the stiff outer member 40, with the compliant center member 20 and the flange 93 of the hub 90 disposed therebetween. This construction ensures that, in the event of the compliant center member 20 wearing out, or otherwise failing, the torque forces will still be transferred to the hub 90.

When the members 20, 40, 60 of the multi-layer gear assembly 16 are joined on the hub 90, their outer peripheral surfaces are aligned so as to register oppositely-directed pairs of teeth 44, 64 on the stiff outer members 40 and 60 with each other and with a central tooth 24 on the compliant central member 20. Referring to FIG. 2, the patterns of the teeth 44 and 64 invest the gear assembly with low or no net axial thrust. Stated another way, the two stiff outer members 40 and 60 form a double helical or herringbone gear pattern so that axial torque acting laterally outward from the outer member 40 is counteracted by axial torque acting laterally outward from the outer member 60. Referring to FIGS. 3 and 4, in some aspects, the compliant center member 20 and the hub 90 include interdigitated elements 25 and 95 that co-operatively function as an anti-turn mechanism acting between the compliant center member 20 and the hub 90. In operation, a sudden rotational acceleration (or deceleration) of the crankshaft 12 is transmitted through the hub 90 to the compliant elements 25, which deform in response, thereby smoothing the gear's response to the impulse.

Preferably, the center member 20 is formed of a compliant or semi-compliant material such as a reinforced nylon material. For example, the compliant or semi-compliant material may be a 40% glass-filled polyamide material such as Zytel® (or possibly, another material). The outer members 40 and 60 and the hub 90 may be formed of structural steel. Although the gear assembly is secured by bolting the outer members 40 and 60 together, the members of the gear assembly 18 can be fixed together in other ways such as by keying them, or by use of splines, or by other attachment techniques.

In operation, after initial impact, (engine startup, or between braking), the compliant center member 20 will receive the torque load first and will slightly deform for a few tenths of a millimeter of compression as the stiff outer members 40 and 60 begin to absorb the gear loads. As the center member 20 deforms, the outer members 40 and 60 increasingly absorb respective torque loads, which are transmitted to the center member 20 via friction between it and the outer members 40 and 60. Consequently, it is only the center member 20 that transfers the total torque load to the hub 90 thereby reducing or eliminating gear rattle.

Figure 5:
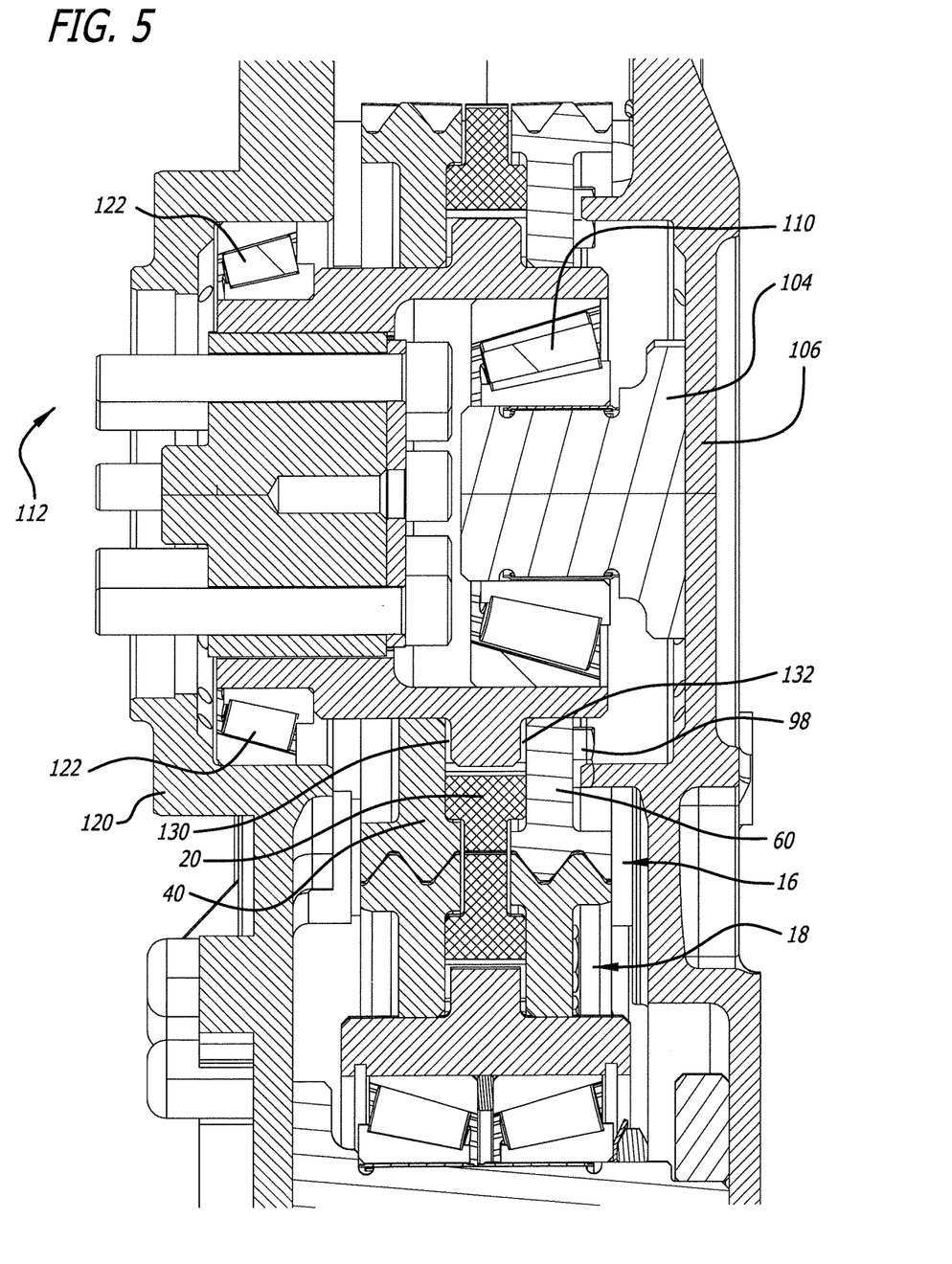
FIG. 5 is a side section of a portion of the gear train of FIG. 1B at A-A.

A gear train constituted of quiet-running gear assemblies according to this specification can be understood with reference to FIGS. 1A, 1B, and 5, in which a gear assembly 16 of the gear train 10 functions as a crank gear. The gear assembly 16 is rotatably mounted on a post 102 mounted by a pedestal 104 to a gear box cover 106. As per FIGS. 4 and 5, the crank gear assembly 16 is rotatably coupled to the post 102 by a bearing assembly 110 acting between the post 102 and the inner sidewall 97 of the hub 90. The gear assembly 16 is mounted on an end of the crankshaft 12 by an attachment assembly 112 including exterior splines 116 that mesh with splines 118 on the inner sidewall 97 of the hub 90. As per FIGS. 4 and 5, the crank gear assembly 16 is rotatably supported on the engine casing 120 by a bearing assembly 122 acting between the engine casing 120 and the outer sidewall 92 of the hub 90. As best seen in FIGS. 1A, 1B, and 5, gear teeth 44, 24, 64 of the bearing assembly 16 are meshed with corresponding gear teeth of an abutting idler gear 18.

As best seen in FIG. 5, the construction of the gear assembly 16 provides axially floating helical gears operative to distribute a torque load between the stiff outer members 40 and 60. In this regard, the stiff outer members 40 and 60 have a floating center tolerance that creates interstitial spaces 130 and 132. These spaces allow for slight movement in the axial direction to automatically compensate for axial loads, thereby offsetting gear backlash incidents. They also allow slight relative movement to compensate for misalignments and/or tolerance variations.

As best seen in FIGS. 3, 4, and 5, the construction of the gear assembly 16 provides axial compliance operative to absorb or damp a portion of a torque load impact between the stiff outer members 40 and 60. In this regard, the threaded fasteners 98 that secure the stiff outer member 60 to the stiff outer member 40 are seated so as to preload the gear assembly 16 with a compressive bias from each stiff outer member acting on the compliant center member 20. While the compliant member 20 is compressed (axial dimension is smaller than before assembly), the threaded fasteners 98 are stretched, that is to say, they are longer than before assembly. Thus, the three members are preloaded. At an impact, the threaded fasteners 98 are stretched further and the center member 20 loses the compression somewhat. Because the threaded fasteners 98 (by further stretching them) will delay how quickly the stress in the gear train builds up they will also limit the peak. In other words, a sudden increase in torque load that tends to separate the stiff outer members 40 and 60 is damped by the axial compliance.

With reference to FIG. 1A, a method of operating the opposed-piston gear train 10 includes coupling rotating crankshaft motion from the crankshafts 12 and 13 into the gear train via gear assemblies 16 and coupling rotating motion out of the gear train via the gear assembly 17 to a power train via the power take-off shaft 19. As the crankshaft 12 rotates, a torque load is received on the members 40, 20, 60 of the gear assembly 16 that is mounted to the crankshaft. The compliant member 20 deforms in response to the torque load, which is increasingly borne by the stiff outer members 40, 60. The stiff outer members frictionally transmit the torque load to the compliant member. Finally, the torque received by the compliant member 20 is transferred to the hub of the gear 16. In some instances rotational impact between the crankshaft 12 and the gear assembly 16 is reduced by deformation of the compliant member with respect to the hub.

It will be clear to a person of ordinary skill in the art that the above-described embodiments may be altered or that insubstantial changes may be made without departing from the scope of the underlying principles. Accordingly, the scope of patent protection afforded hereby is determined by the scope of the following claims and their equitable equivalents.

The invention claimed is:

1. A gear assembly, comprising:
   a center member of compliant material and including an outer peripheral surface with a plurality of teeth formed thereon;
   a pair of outer members of stiff material, each outer member including an outer peripheral surface with a plurality of teeth formed thereon and disposed in a respective directed axial thrust pattern, a first outer member of the pair of outer members comprising a plurality of threaded apertures circumferentially spaced on a first inwardly projecting flange and a second outer member of the pair of outer members comprising a plurality of countersunk apertures circumferentially spaced on a second inwardly projecting flange;
   a hub;
   an anti-turn mechanism comprising:
      a plurality of bosses spaced circumferentially on an inner surface portion of the center member, each boss having a sidewall portion that protrudes in an inward radial direction of the center member; and
      a plurality of semicircular indentations spaced circumferentially on an outwardly projecting flange situated on an outer sidewall of the hub;
      wherein the bosses and semicircular indentations are aligned, and the center member is fitted to the outwardly projecting flange with the sidewall portions of the bosses received in the plurality of indentations; and
   a plurality of threaded fasteners that secure the pair of outer members to each other, each threaded fastener situated through one threaded aperture, one countersunk aperture, and one of the plurality of bosses on an inner surface portion of the center member such that the outer members are secured together on the hub with the center member disposed therebetween.

2. The gear assembly of claim 1, in which the respective directed axial thrust patterns define one of a double helical gear pattern and a herringbone gear pattern.

3. The gear assembly of claim 2, in which the plurality of teeth of the center member define one of a spur gear and a straight-cut gear.

4. The gear assembly of claim 1, wherein the threaded fasteners, the pair of outer members, and the center member provide an axial compliance means for damping a portion of a torque load impact between the outer members, in which the threaded fasteners that secure the first and second outer members are seated so as to preload the gear assembly with a compressive bias from each outer member acting on the center member.

5. An opposed-piston engine, comprising an engine housing and a gear train mounted on the engine housing, in which the gear train includes a plurality of gears for coupling a pair of crankshafts to an output drive, wherein, each of the gears includes:
   a center member of compliant material and including an outer peripheral surface with a plurality of teeth formed thereon;
   a pair of outer members of stiff material; each outer member including an outer peripheral surface with a plurality of teeth formed thereon and disposed in a respective directed axial thrust pattern, a first outer member of the pair of outer members comprising a plurality of threaded apertures circumferentially spaced on a first inwardly projecting flange and a second outer member of the pair of outer members comprising a plurality of countersunk apertures circumferentially spaced on a second inwardly projecting flange;
   a hub;
   an anti-turn mechanism comprising:
      a plurality of bosses spaced circumferentially on an inner surface portion of the center member, each boss having a sidewall portion that protrudes in an inward radial direction of the center member; and
      a plurality of semicircular indentations spaced circumferentially on an outwardly projecting flange situated on an outer sidewall of the hub;
      wherein the bosses and semicircular indentations are aligned, and the center member is fitted to the outwardly projecting flange with the sidewall portions of the bosses received in the plurality of indentations; and
   a plurality of threaded fasteners that secure the pair of outer members to each other, each threaded fastener situated through one threaded aperture, one countersunk aperture, and one of the plurality of bosses on an inner surface portion of the center member such that the outer members are secured together on the hub with the center member disposed therebetween.

6. The opposed-piston engine of claim 5, in which the respective directed axial thrust patterns define one of a double helical gear pattern and a herringbone gear pattern.

7. The opposed-piston engine of claim 6, in which the plurality of teeth of the center member define one of a spur gear and a straight-cut gear.

8. The opposed-piston engine of claim 5, wherein, in each gear, the threaded fasteners, the pair of outer members, and the center member provide an axial compliance means for damping a portion of a torque load impact between the outer members, in which the threaded fasteners that secure the first and second outer members are seated so as to preload the gear with a compressive bias from each outer member acting on the center member.

9. The gear assembly of claim 1, wherein, in use, the center member is configured to:

receive torque load first, after initial impact, and slightly deform;

allow the outer members to increasingly absorb respective torque loads as the center member deforms;

receive torque loads transmitted from the outer members via friction between it and the outer members; and be the only member that transfers a total torque load to the hub.

10. The opposed-piston engine of claim 5, wherein in operation, each gear of the gear train is configured to:

transfer torque loads to the center member first, after initial impact, and slightly deform the center member;

allow the outer members to increasingly absorb respective torque loads as the center member deforms;

transmit torque loads from the outer members to the center member via friction; and transfer a total torque load to the hub through the center member.

* * * * *

UNITED STATES PATENT AND TRADEMARK OFFICE
CERTIFICATE OF CORRECTION

PATENT NO.        : 9,618,108 B2
APPLICATION NO.   : 13/944787
DATED             : April 11, 2017
INVENTOR(S)       : Balazs V. Palfai et al.

Page 1 of 1

It is certified that error appears in the above-identified patent and that said Letters Patent is hereby corrected as shown below:

In the Specification

-- Column 2, Line 49, change "shaft 19" to read "shaft 14" --

-- Column 4, Line 25, change "assembly 18" to read "assembly 16" --

-- Column 4, Line 41, change "FIGS. 1A, 1B, and 5" to read "FIGS. 1A, 1B, 4 and 5" --

-- Column 4, Line 54 and 55, change "FIGS. 1A, 1B, and 5" to read "FIG. 2" --

-- Column 5, Line 27, change "shaft 19" to read "shaft 14" --

Signed and Sealed this
Sixteenth Day of May, 2017

Michelle K. Lee
*Director of the United States Patent and Trademark Office*